United States Patent Office 3,236,877
Patented Feb. 22, 1966

3,236,877
5-(AMINO, ALKYLAMINO AND ARALKYLAMINO NAPHTHYL) N-METHYLCARBAMATES
John R. Kilsheimer, South Charleston, W. Va., and Herbert H. Moorefield, Raleigh, N.C., assignors to Union Carbide Corporation, a corporation of New York
No Drawing. Filed Dec. 30, 1960, Ser. No. 79,522
5 Claims. (Cl. 260—479)

This invention relates to new chemical compounds and to insecticidal compositions containing them. More particularly, this invention relates to substituted aminonaphthyl and alkylaminonaphthyl N-methylcarbamates and their hydrochloride salts and to insecticidal compositions containing the same.

The compounds of this invention can be represented by the following formula:

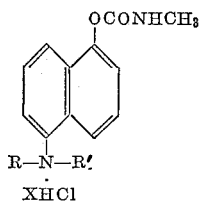
XHCl wherein X is an integer having a value of 0 or 1 and R and R' are selected from the group consisting of hydrogen, lower alkyl and aralkyl radicals wherein said R and R' can be the same or different. Examples of such compounds include 1-(5-aminonaphthyl) N-methylcarbamate,
1-(5-N',N'-dimethylaminonaphthyl) N-methylcarbamate,
1-(5-N',N'-diethylaminonaphthyl) N-methylcarbamate,
1-(5-N',N'-di-n-propylaminonaphthyl) N-methylcarbamate,
1-(5-N',N'-di-isopropylaminonaphthyl) N-methylcarbamate, the
1-(5-N',N'-dibutylaminonaphthyl) N-methylcarbamates, the
1-(5-N',N'-dipentylaminonaphthyl) N-methylcarbamates, the
1-(5-N',N'-dihexylaminonaphthyl) N-methylcarbamates, the
1-(5-N',N'-diheptylaminonaphthyl) N-methylcarbamates, the
1-(5-N',N'-dioctylaminonaphthyl) N-methylcarbamates,
1-(5-N'-methyl-N'-ethylaminonaphthyl) N-methylcarbamate,
1-(5-N'-methyl-N'-propylaminonaphthyl) N-methylcarbamate,
1-(5-N'-methyl-N'-pentylaminonaphthyl) N-methylcarbamate,
1-(5-N'-methyl-N'-hexylaminonaphthyl) N-methylcarbamate,
1-(5-N'-ethyl-N'-propylaminonaphthyl) N-methylcarbamate,
1-(5-N'-ethyl-N'-pentylaminonaphthyl) N-methylcarbamate,
1-(5-N'-methyl-N'-benzylaminonaphthyl) N-methylcarbamate and the like.

Particularly preferred are the compounds wherein R and R' have up to about 7 carbon atoms.

The compounds of this invention can be prepared generally by reacting the appropriate substituted 1-naphthol with phosgene in the presence of a base to form the corresponding chloroformate. The chloroformate is then reacted with monomethylamine to form the substituted 1-naphthyl N-methylcarbamate. This synthesis can be graphically represented by the following equations:

STEP A

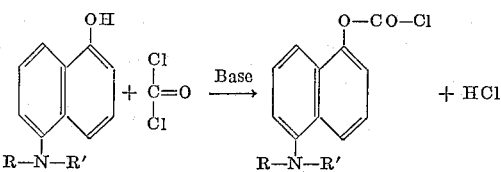

STEP B

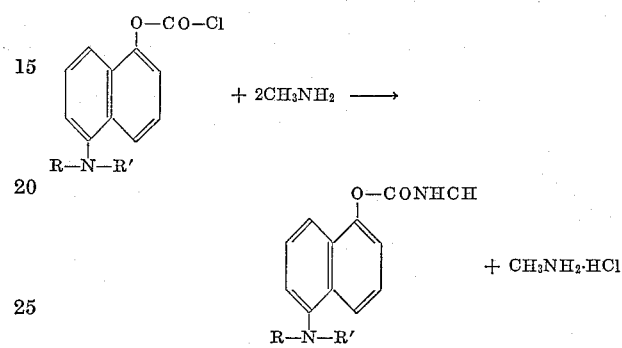

Step A can be conducted at a temperature of from about −30° C. to about 175° C. The reaction can be initiated by adding phosgene dissolved in toluene, benzene, or other suitable organic solvent, to an aqueous solution of the substituted naphthol and a base, preferably sodium hydroxide. The reaction is generally exothermic so that some external cooling is usually necessary. This reaction can be conducted in the presence of basic compounds other than sodium hydroxide, such as pyridine and dimethylaniline, to facilitate removal of hydrogen chloride as an organic hydrochloride. In these cases the reaction can be advantageously conducted in anhydrous solvents, such as toluene, dioxane and the like.

Step B can be conducted at a temperature of from about −30° C. to about 100° C. The chloroformate can be added to a solution of methylamine in a solvent such as water, benzene, hexane, dioxane and toluene.

When the products are crystalline solids they can be separated from the reaction mixture by filtration or centrifugation and dried. In other cases the solvent is removed by distillation and the product is taken as a residue.

An alternate procedure for the preparation of the compounds of this invention is by the reaction of the appropriate substituted 1-naphthol with methyl isocyanate, as represented by the following schematic equation:

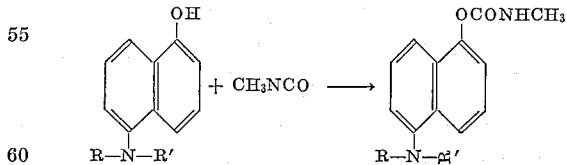

This reaction is conducted by reacting the appropriate naphthol with methyl isocyanate in the presence of an anhydrous, inert solvent and a catalyst in a pressure vessel under autogenous pressure and at from about ambient temperatures to about 200° C. The solvent is distilled off from the reaction mixture, leaving as a residue, the methylcarbamate. The catalyst can be an organo-metallic compound such as dibutyl tin diacetate or an organic tertiary amine such as pyridine. Applicable reaction solvents are ethyl ether, benzene, methanol, and mixtures thereof. When R and R' are hydrogen this process must be modified. The amine group is first blocked with a group such as acetyl or other suitable groups. The naphthol is then converted to the carbamate, after which the blocking group is removed.

The following examples are illustrative of the preparation of the compounds of this invention:

Example I 1-(5-AMINONAPHTHYL) N-METHYLCARBAMATE

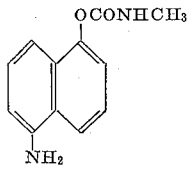

A mixture containing 121 grams of 5-acetamido-1-naphthol, 3 grams of dibutyl tin diacetate, and 500 milliliters of dioxane was charged to a reaction vessel and heated to 25° C., after which 31.3 grams of methyl isocyanate were added to the reaction mixture over a period of 30 minutes. The resulting mixture was held at 25° C. with agitation for three days, after which the dioxane was distilled off. The solid residue remaining in the reaction vessel was heated with methanol to the boiling point and then cooled to −40° C. The crystals of 1-(5-acetamidonaphthyl) N-methylcarbamate that formed upon cooling were filtered from the alcohol and dried.

A mixture containing 25.8 grams of 1-(5-acetamidonaphthyl) N-methylcarbamate, 20 grams of concentrated hydrochloric acid, and 100 milliliters of acetic acid was charged to a reaction vessel and heated at the boiling point (approximately 100° C.) for 2.5 hours. The mixture was then cooled to 25° C. and filtered. To the filtrate were added 200 milliliters of a mixture of equal parts by volume of ethyl ether and petroleum ether. An insoluble oil phase was formed. The water and ether phases were discarded and acetone was added to the insoluble oil layer. The solid that formed was filtered from the mixture and air dried. The solid is 1-(5-aminonaphthyl) N-methylcarbamate hydrochloride which has a melting point of 225° C. and analyzed as follows: N, 10.7%; Cl, 13.4% (calculated N, 11.1%; Cl, 14.0%). A portion of the dry solid was dissolved in water and the resulting solution was neutralized with sodium bicarbonate, whereby 1-(5-aminonaphthyl) N-methylcarbamate precipitated. The carbamate crystals were filtered out of the mixture, washed with water, and then with ethyl ether, and air dried. The crystals thus recovered melted at 124° C. and analyzed as follows: C, 68.1%; H, 5.9%; N, 11.5% (calculated: C, 66.6%; H, 5.7%; N, 13.0%). The desired 1-(5-aminonaphthyl) N-methylcarbamate contains a small amount of 5-amino-1-naphthol formed during the sodium, bicarbonate neutralization step.

Example II 1-(5-N′,N′-DIMETHYLAMINONAPHTHYL) N-METHYLCARBAMATE

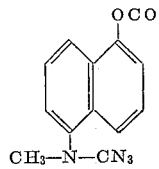

A mixture containing 40 grams of 5-N,N-dimethylamino-1-naphthol, 13 grams of methyl isocyanate, 5 drops (approximately 0.3 cc.) of pyridine and 100 milliliters of anhydrous benzene was charged to a pressure vessel and was held at ambient temperature and under autogenous pressure for four days. The resulting reaction mixture was removed from the pressure vessel and distilled to remove the benzene. The solids residue that remained was recdystallized from xylene and dried. The 1-(5-N′,N′-di-methylaminonaphthyl) N-methylcarbamate thus produced weighed 24 grams, melted at 133° C. and analyzed as follows: N, 11.3 percent (calculated: N, 11.5 percent).

Example III 1-(5-N′,N′-DIETHYLAMINONAPHTHYL) N-METHYLCARBAMATE

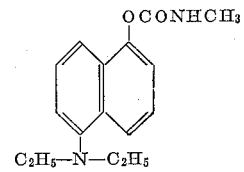

A mixture of 50 grams of 5-N,N-diethylamino-1-naphthol, 20 grams of methylisocyanate, 5 drops (approximately 0.3 cc.) of pyridine, and 100 milliliters of ethyl ether was charged to a pressure vessel and was held at ambient temperature and autogenous pressure for four days. The resulting reaction mixture was removed from the pressure vessel and ethyl ether was removed by distillation. The solid residue that remained was 1-(5-N′,N′-diethylaminonaphthyl) N-methylcarbamate and weighed 62 grams, which analyzed as follows: N, 10.1 percent (calculated: N, 10.3 percent).

Example IV 1-5(N′-METHYL-N′-ETHYLAMINONAPHTHYL) N-METHYLCARBAMATE

Employing the procedure of Example III, 1-(5-N′-methyl-N′-ethylaminonaphthyl) N-methylcarbamate is prepared by the reaction of 5-(N-methyl-N-ethylamino)-1-naphthol and methyl isocyanate in the presence of pyridine and ethyl ether.

The compounds of the instant invention are useful as insecticides. They are particularly effective as insecticides against Mexican bean beetles and bean aphids, as is demonstrated by the following tests.

The compounds of the instant invention are reported in the below-described tests as follows:

| Compound No.: | Compound |
| --- | --- |
| I | 1-(5-aminonaphthyl) N-methylcarbamate. |
| II | 1-(5-N′,N′-dimethylaminonaphthyl) N-methylcarbamate. |
| III | 1-(5-N′,N′-diethylaminonaphthyl) N-methylcarbamate. |
| IV | 1-(5-aminonaphthyl) N-methylcarbamate hydrochloride. |

Stock formulations of the compounds listed above were prepared by mixing 100 milligrams of the toxicant with 10 milliliters of acetone and 10 milligrams of a dimeric alkylated aryl polyether alcohol commercially sold as a wetting agent. This mixture was then diluted with water to give 100 milliliters of a standard insecticidal solution. Lower, graded, test concentrations were prepared by diluting the standard stock solution with water to give the desired concentration of toxicant. The solutions containing various concentrations in a dilution series were then tested on Mexican bean beetle larvae and bean aphids. Percent mortality of the test insects was plotted against the toxicant concentration on logarithmic probability paper. The concentration in milligrams of toxicant per 100 milliliters of solution needed for 50 percent mortality ($LD_{50}$ value) was interpolated from a line drawn through the points so plotted.

MEXICAN BEAN BEETLE LEAF DIP TEST

The test insects were fourth instar larvae of the Mexican bean beetle (*Epilachna varivestis* Muls.), that had been reared on Tendergreen beans at a temperature of 80° F. ±5° F. and a relative humidity of 50 percent ±5 percent. Four randomly selected larvae were placed in a 9-cm. Petri dish lined with filter paper and containing a leaf of a Tendergreen bean plant. The leaves were prepared by excising paired seed leaves from the bean plants and dipping the excised leaves in the test solutions prepared according to the above directions until thoroughly wetted. Excess liquid was removed from the surface of the leaf by gentle shaking. The leaves were then dried in a ventilated hood. Wilting of the leaves during drying was prevented by placing the leaf stems in water. The dried, paired leaves were then separated and a single leaf was placed in each Petri dish. After placing the leaf and larvae in the Petri dishes, the dishes were closed, labeled, and heated at 80±5° F. for three days. Although the larvae could easily consume the whole leaf within twenty-four to forty-eight hours, no additional leaves were added. Larvae exposed to untreated leaves remained vigorous during the entire holding period and did not advance to the quiescent prepupal state. Larvae which were unable to move the length of the body, even upon prodding, were considered dead.

APHID FOLIAGE SPRAY TEST

The test insects were adult and nymph stage bean aphids (*Aphis fabae* Scop.) reared on potted dwarf nasturtium plants at a temperature of 65 to 70° F. and a relative humidity of 50 to 70 percent. The aphid populations in the pots were reduced to 100 to 150 individuals per pot by trimming off plants containing excess aphids. The pots were sprayed with toxicant solution, employing a "DeVilbiss" spray gun at forty pounds pressure, for thirty seconds, in which time 100 to 110 milliliters of the test solution, an amount sufficient to wet the plants to runoff, was applied. A control solution consisting of 100 to 110 milliliters of an aqueous solution of acetone and wetting agent was also sprayed on infested plants. After spraying, the pots were placed on their sides on a sheet of white paper that had been previously ruled into squares to facilitate counting, and held for twenty-four hours at a temperature of 80° F. ±5° F. and a relative humidity of 50 percent ±5 percent. Aphids that had fallen to the paper and were unable to remain standing after being uprighted and those remaining on the plants that could not move the length of the body, even upon prodding, were considered dead.

The results of the above-described tests are summarized in Table I below.

Table I

| Compound | $LD_{50}$ Values, mg./100 ml. | |
|---|---|---|
| | Mexican Bean Beetle | Bean Aphid |
| I | 6 | 7 |
| II | 2 | 1 |
| III | 2 | 2 |
| IV | 5 | 9 |

From Table I it can be seen that the compounds of the instant invention are useful as insecticides and are very effective when employed against Mexican bean beetles or bean aphids. The compounds of the instant invention are also insecticidally active toward the southern armyworm and house flies. Furthermore, they are stable in the presence of light and air.

The compounds of the instant invention can be applied to plants or other areas to be protected by contacting such area with a compound of the instant invention in an undiluted form, as a dust when admixed with finely powdered inert carriers, or in a liquid form. The rate of application can vary from about 0.5 to about 5 pounds of the compound per acre.

When the compounds of the instant invention are applied as dusts they can be mixed with suitable particulate extenders, such as clay, chalk, talc, diatomaceous earth, pyrophyllite, infusorial earth, fuller's earth, pumice, bentonite, and flours, such as cotton seed flour and walnut shell flour.

The application of the instant compounds in a liquid medium can be accomplished in any of several ways. For example, a compound of this invention can be directly dispersed in a liquid carrier such as water, petroleum distillates and the like with or without the use of surface active agents.

Another method of preparation of liquid compositions containing the compounds of this invention is to first prepare a liquid concentrate containing such compounds by dissolving said compound in a solvent such as acetone, toluene, xylene or kerosene. This liquid concentrate can then be added to water together with suitable surface active dispersing agents whereby the compounds of the instant invention are dispersed in the water.

A third method of preparing liquid compositions containing the instant compounds is to prepare a wettable powder by dispersing said compounds on or in a finely divided inert solid such as clay, chalk, talc, bentonite, fuller's earth and the like. These compositions may also contain dispersing or wetting agents as desired. These compositions can then be mixed with water to provide a liquid insecticide suitable for application to the areas to be treated.

The surface active agents that can be employed in the above-described compositions can be any of the known anionic, cationic and non-ionic wetting, emulsifying and dispersing agents, such as aralkyl polyether alcohols, aralkyl polyether sulfonates, aralkyl polyether sulfates, quaternary ammonium compounds, and the like. When these surface active agents are employed they generally comprise from about 0.5% to about 5% by weight of the total composition.

We claim:
1. The compound having the structural formula:

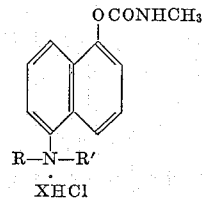

wherein X is an integer having a value of 0 to 1 and R and R' are independently selected from the group consisting of hydrogen, lower alkyl and aralkyl radicals.

2. 1-(5-aminonaphthyl) N-methylcarbamate.
3. 1 - (5 - N',N'-dimethylaminonaphthyl) N-methylcarbamate.
4. 1 - (5-N',N'-diethylaminonaphthyl) N-methylcarbamate.
5. 1-(5-aminonaphthyl) N-methylcarbamate hydrochloride.

References Cited by the Examiner

UNITED STATES PATENTS

| 2,493,710 | 1/1950 | Aeschlimann et al. | 260—479 |
| 2,776,197 | 1/1957 | Gysin et al. | 260—479 X |
| 2,903,478 | 9/1959 | Lambreck | 260—479 |
| 2,904,464 | 9/1959 | Moorefield | 167—32 |
| 2,904,465 | 9/1959 | Moorefield | 167—32 |

FOREIGN PATENTS 578,169   6/1959   Canada.

LORRAINE A. WEINBERGER, *Primary Examiner.*

WILLIAM B. KNIGHT, A. LOUIS MONOCELL, ABRAHAM H. WINKELSTEIN, *Examiners.*